Dec. 5, 1939.   F. J. GANTNIER   2,182,398
FILM SPOOL
Filed Nov. 18, 1937
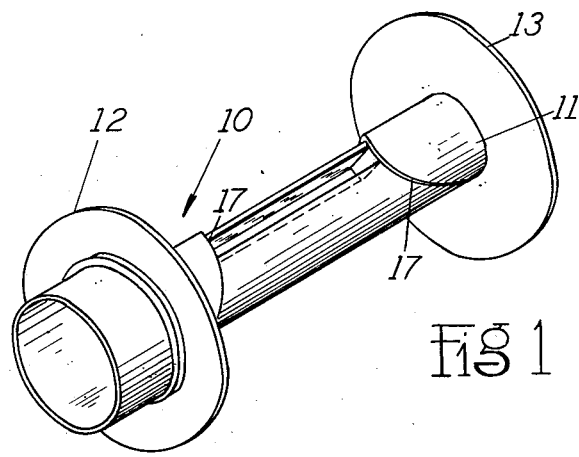
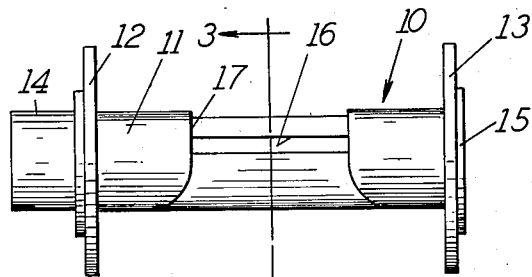
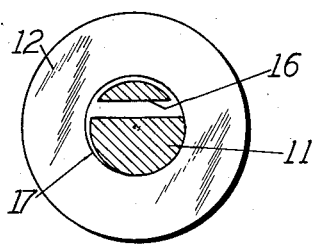
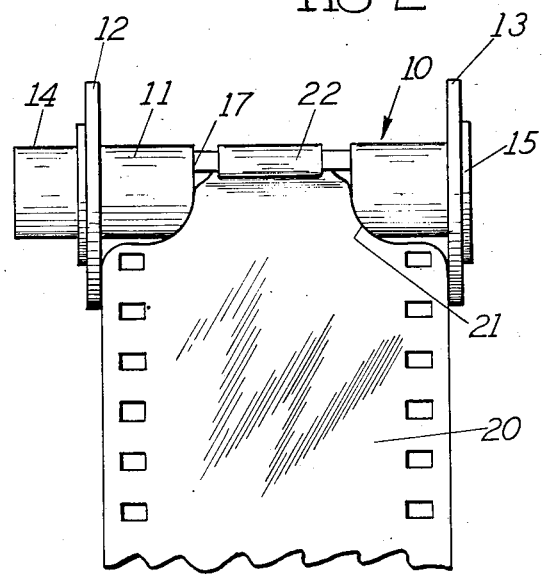
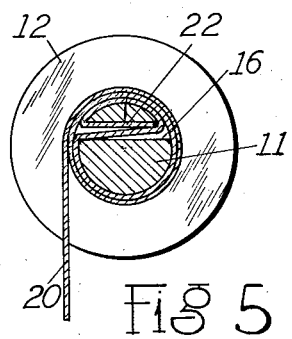
INVENTOR.
FRANK J. GANTNIER
BY
ATTORNEY.

Patented Dec. 5, 1939

2,182,398

UNITED STATES PATENT OFFICE 2,182,398

FILM SPOOL

Frank J. Gantnier, Binghamton, N. Y., assignor, by mesne assignments, to Agfa Ansco Corporation, Binghamton, N. Y., a corporation of Delaware Application November 18, 1937, Serial No. 175,300

2 Claims. (Cl. 242—74)

This invention relates to improvements in film spools for use in cameras.

A primary object of this invention is the provision of a spool upon which a film may be wound in such manner that pressure marks occasioned on the body of the film by the tight winding of the film about the narrow portion thereof adjacent the spool may be obviated.

As conducive to a clearer understanding of this invention, it may here be pointed out that it is conventional for rolls of film of certain types to be provided at an extremity with a narrowed or tapered portion for engagement with the film spool. As the film is wound this tapered portion is, of course, adjacent the spool and after succeeding wider film is wound about the narrowed portion under varying degrees of pressure the surface on which the successive widths of film rest has hitherto been uneven, due to the fact that the narrow end portion of the film rested upon the surface of the spool whereas the succeeding wider portions thereof rested upon the previously wound narrower portion of the film adapted for securing the same to the spool. This condition frequently resulted in a finished film having pressure marks thereon in conformity with the difference in level between the surface of the film spool and the narrowed portion of the film, and occasioned by the difference in pressure on the convolutions wound around the uneven surface at the spool.

The principal object of this invention is therefore to eliminate such pressure marks upon films of the type having a narrowed portion to enable the same to be attached to the spool, by providing a spool which will provide a smooth even supporting surface for the convolutions of film.

Other objects will in part be obvious and in part be pointed out hereinafter.

The invention accordingly consists in the combinations of elements, arrangements of parts and features of construction all as will be more fully pointed out hereinafter and shown in the accompanying drawing.

Figure 1 is a perspective view of one form of device embodying this inventive concept.

Figure 2 is a side elevational view of the device shown in Figure 1.

Figure 3 is a sectional view taken along the line 3—3 of Figure 2.

Figure 4 is a view similar to Figure 2 but showing a portion of reel of film wound on the spool.

Figure 5 is a view similar to Figure 3 but showing a portion of film wound thereon.

Similar reference characters refer to similar parts throughout the several views of the drawing.

Having reference now to the drawing, there is generally indicated at 10 a spool adapted for the winding of film comprised of a central portion 11 and two oppositely disposed end flange portions 12 and 13, portions 12 and 13 being provided respectively with projecting portions 14 and 15 adapted for engagement with any desired mounting mechanism associated with a camera. Central portion 11 is provided with a slot 16 adapted to receive an end of a film in a manner to be more fully pointed out hereinafter.

Adjacent slot 16 is a groove 17 extending partially about the circumference of member 11. Groove 17 varies in width, as best shown in Figures 1 and 2, from a width slightly greater than the width of the end portion of a conventional film, adjacent the slot 16 to a width, as best shown in Figure 1, corresponding to the full width of the film. Similarly groove 17 varies from a depth substantially equal to the thickness of the film at that point adjacent groove 16 by means of gradual incline to level relationship with the remainder of the central portion.

Having reference now to Figures 4 and 5 there is generally indicated at 20 a film provided with an end 21 which tapers gradually inwardly to a relatively narrow attaching strip 22, as best shown in Figure 4. In attaching the film to the spool, the end of attaching strip 22 is first inserted in slot 16 passed in an anti-clockwise direction, as viewed in Figure 5, about the narrowed portion of member 11 above slot 16 and the extreme end reinserted in slot 16. The remainder of the film is then wound around the spool, as seen in Figure 5, thus forming a relatively secure connection between the spool and the film. It will be seen that the narrowed portion 21 of film 20 is of a configuration adapted to fit snugly into groove 17 and that when the device is wound in the manner shown in Figures 4 and 5 the termination of the groove 17, that is the point at which its width equals the full width of the film and its bottom coincides with the outer surface of the portion 11, corresponds exactly to that point at which tapered portion 21 of film 20 runs into the full width of the film. Thus when the film is wound on spool 10, the narrowed or tapered portion thereof lies in groove 17 which is as above stated of a depth at its deepest point corresponding to the thickness of the film and upon further winding of the film when the full width portion of the film is juxtaposed to the spool the underlying or supporting surface therefor, comprised of central portion 11 and narrowed portion 21 of the film, is substantially flush throughout its entire width thus avoiding any additional thickness in any given portion of the roll to impart pressure marks to the film.

From the foregoing it will now be seen that there is herein provided a structure which accomplishes all the objects of this invention including many advantages of great practical utility.

As many embodiments may be made of this inventive concept and as many modifications may be made in the embodiment herein shown and described, it is to be understood that all matter hereinbefore set forth or shown in the accompanying drawing is to be interpreted merely as illustrative and not in a limiting sense.

I claim as my invention:

1. In a film spool for use with a roll of film having a narrowed end portion, in combination a pair of end flanges, a central portion, said central portion having a slot therethrough to receive and secure the end of said film, said central portion having a tapered groove therein of a depth tapering from the thickness of the film to zero and having a width conforming to the shape of said end portion to accommodate the narrowed end portion of said film and hence provide a substantially level surface upon which to wind the relatively wide portion of said film.

2. In a film spool for use with a roll of film having a narrowed end portion, in combination a pair of end flanges, a central portion, means provided by said central portion to secure the end of said film, said central portion having a tapered groove therein of a depth tapering from the thickness of the film to zero to accommodate the narrowed end portion of said film and hence provide a substantially level surface upon which to wind the relatively wide portion of said film, said groove being of a varying width to conform to the width of said narrowed end portion of said film.

FRANK J. GANTNIER.